Figure 6:
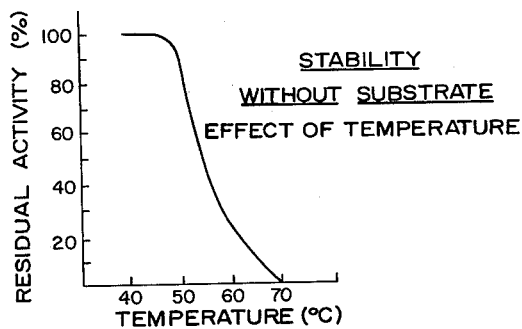

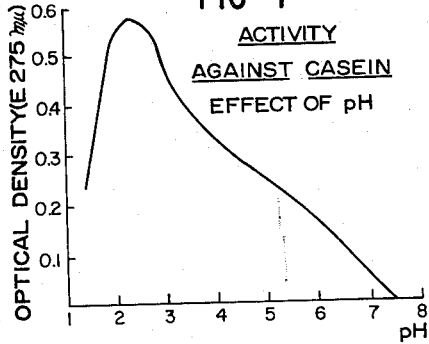
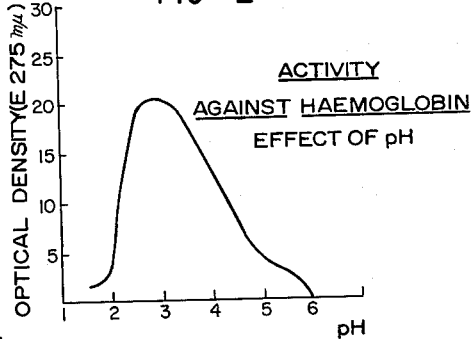
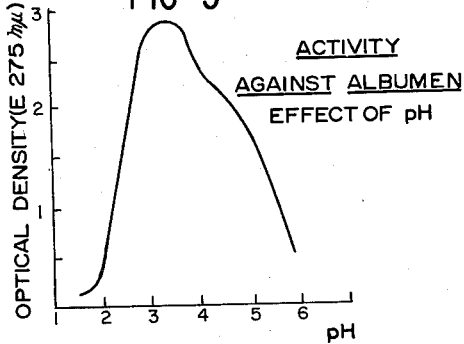
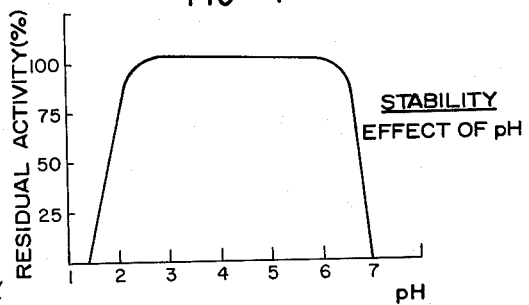
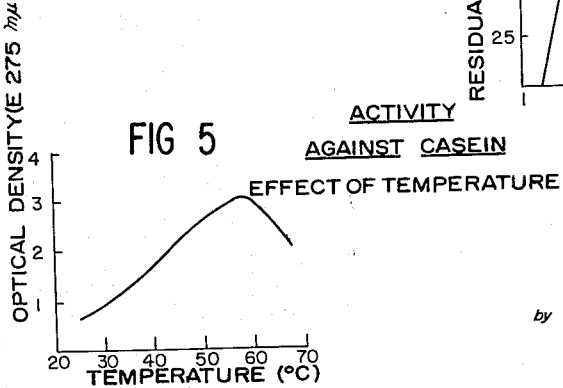

STABILITY WITHOUT SUBSTRATE EFFECT OF TEMPERATURE

ULTRAVIOLET ABSORPTION SPECTRUM

INVENTORS
Hirao Shimazono
Katsumi Tomoda

United States Patent Office 3,097,145
Patented July 9, 1963

3,097,145
ACID PROTEASE AND THE PRODUCTION
THEREOF
Hirao Shimazono, Suita, and Katsumi Tomoda, Toyonaka, Japan, assignors to Takeda Chemical Industries, Ltd., Osaka, Japan
Filed Mar. 30, 1962, Ser. No. 183,919
5 Claims. (Cl. 195—62)

This invention relates to a method for producing protease, and more particularly, to a method for the production of acid protease, which is useful in the food industry as well as for medicinal purposes such as a digestive.

It is known that proteases, which have a catalyzing activity on the hydrolysis of peptide bonds in various proteins, are contained in animal viscera or in the cells and culture broth of microorganisms such as molds and bacteria, and some of these proteases can be industrially produced and are commercially available. Proteases may be divided on the basis of the optimal pH at which they exhibit the said catalytic activity into three groups, i.e. neutral protease, alkaline protease and acid protease. Commercially available proteases are almost exclusively neutral proteases.

One of the shortcomings of known protease production is the low yield of protease inevitably caused by the poor capacity of the microorganisms employed for producing the protease. Another defect is that neutral protease shows neither desirable catalytic action nor stability under acidic conditions of pH lower than 4.

In sharp contrast, the microorganisms employed in the present invention can produce and accumulate acid protease in a high concentration in the culture broth. Moreover, the acid protease shows maximum catalytic activity at an acidic pH ranging about from 1 to 4, and this characteristic of the acid protease is especially suitable for a digestive which acts against dietary protein in the stomach where gastric fluid provides strongly acid conditions of about pH 1 to 3.

It is known that acid protease is produced by Aspergilli, and that industrial production has been tried, employing one of these microorganisms, for rendering the useful acid protease commercially available. However, these attempts have not yet yielded any desirable result because of the fact that the cultivation of the microorganism has been carried out by solid culture, for example according to the so-called koji-process, and such a process cannot readily be scaled up to industrial magnitude.

The present invention is based on the use of microorganisms belonging to the family Polyporaceae, these organisms being widely, capable of producing protease in good yield; more especially, the protease thus produced is usually acid protease showing a remarkably strong and stable activity to catalyze the hydrolysis of peptide bonds in proteins.

Based upon the widely acknowledged classification of microorganisms, the family Polyporaceae is placed in the following situation:

Subdivision ---------------------------- Eumycetales
   Class -------------------------------- Basidiomycetes
      Order ---------------------------- Agaricales
         Family -------------------- Polyporaceae It is a novel feature of this invention that any of the microorganisms belonging to even the wide scope of the class Basidiomycetes, not to speak of those of the family Polyporaceae, can produce acid protease; more especially, it is a novel aspect of this invention that the protease production is carried out by the use of said microorganisms belonging to the family Polyporaceae.

As the classification of fungi is rather complicated and a microorganism is sometimes called by two or more names which may be quite different from each other, the descriptions of the microorganisms in this specification is based on the system set forth in "Mycological Flora of Japan" by Seiya Ito, vol. II, published by Yokendo, Tokyo, Japan, in 1955.

Thus, the principal object of the present invention is to provide a process for producing novel protease, especially the acid protease, which has stable and strong activity for catalyzing the hydrolysis of peptide bonds in proteins at an acid pH.

Another object of this invention is to provide a method for the production of acid protease which can be efficiently carried out on an industrial scale with very good yield.

It is a further object of the invention to provide an acid protease which is novel and useful in the food industries, and for medicinal purposes such as a digestive, etc. owing to its stability and strong activity to degrade proteins at an acidic pH.

The first object is realized by incubating a fungus selected from those belonging to the family Polyporaceae in an appropriate liquid medium containing assimilable carbon sources, digestible nitrogen sources and other necessary nutrients for the growth of the fungus under aerobic conditions, and by recovering from the resulting broth the protease produced.

The microorganism used in the method of this invention can be selected from those belonging to the family Polyporaceae. Among those microorganisms of this family, *Trametes sanguinea* (L. ex Fr.) Lloyd (=*Polystictus sanguineus* Fr.), *Trametes cinnabarino* (Jacq.) Fr. (=*Polystictus cinnabarinus* Sacc.), *Poria vaporaria* (Fr. non Pers.) Cooke, etc., for example, have been found to be especially suitable for the process of this invention because of their properties not only to produce respectively a stable acid protease having very strong activity but also to accumulate a large amount of the acid protease during the cultivation in a liquid medium in a tank. That is to say, an industrial production of acid protease has become possible by the use of these microorganisms.

For the purpose of industrial production, it is in general preferable to use liquid culture media. Thus, the present invention now makes it possible to produce acid protease industrially.

As the assimilable carbon sources, one or more of glucose, dextrin, soluble starch, sucrose, maltose, lactose, etc., for example, may be used, and various organic compounds or organic materials such as organic ammonium salts, organic nitrates, urea, various amino acids, cornsteep liquor, peptone, polypeptone, casein, meat extract, soybean cake, soybean flour, potato juice, etc. may be used not only as carbon source but also as digestible nitrogen source in the same way as the use of inorganic nitrogen sources, for example, inorganic ammonium salts, such as ammonium sulfate, ammonium carbonate, ammonium phosphate, ammonium nitrate, etc. or inorganic nitrates such as sodium nitrate, potassium nitrate, etc. In addition, mineral salts, phosphates, vitamins or growth factors may desirably be used for the culture media as accessory nutrients, e.g. water-soluble salts of vitamin $B_1$.

The initial pH of the culture medium is adjusted to about 3 to 7. When *Trametes sanguinea* (L. ex Fr.) Lloyd is used for the production of the acid protease, it is preferred to incubate the microorganism in the liquid medium adjusted to and kept at a pH of about 3, especially from 3.0 to 3.2, because the resulting culture filtrate contains more than two times as much acid protease as in the case where the medium is adjusted to about pH 5.

(The preparation of acid protease is also possible even by the means so-called koji-process where solid materials such as sawdust, rice bran, wheat bran, etc. are used for the culture.)

The incubation is carried out desirably at a temperature of about 25–35° C. and the accumulated protease in the culture broth reaches the maximum usually between the second and the fifteenth day of incubation. Under such conditions, the protease produced by the microragnism is not accumulated within mycelia, but penetrates out to the environment and is accumulated in the culture medium. Therefore, in the method of the present invention, the accumulated protease is mainly recovered from the liquid part of the culture broth, usually from the filtered broth.

Generally-known means for recovering enzymes from their solutions can be applied to the recovery of the protease by utilizing the properties of the same. The protease obtained by the present invention can be adsorbed on various adsorbents, or can be precipitated by precipitants. Moreover, general means for recovery such as precipitation near the isoelectric point, salting out, dialysis, and combinations of these expedients may be effected for the purpose of recovery and purification.

For example, an aqueous solution containing the protease is subjected to salting out by the addition of a salt such as sodium sulfate, ammonium sulfate, sodium chloride, or the like to the solution, or to fractional precipitation by the addition of an appropriate hydrophilic organic solvent such as methanol, ethanol, normal-propanol, acetone, dioxane, tetrohydrofurane, or the like to the solution.

As the acid protease obtained by the present invention is stable at a rather high temperature such as 40 to 50° C.—or 60 to 70° C. when the acid protease is placed concomitantly with its susbtrates, i.e. proteins—as well as at fairly strong acid pH, the filtered broth wherein concentration of the protease is still low, may directly be concentrated under reduced pressure. If desired, it may be freeze-dried.

When it is desired to employ an adsorption process, adsorbents such as calcium phosphate, alumina, bentonite —a colloidal native hydrated aluminium silicate (clay) —magnesium silicate, carboxymethylcellulose, weak acid carboxylic acid-type cation exchange resin, and the like, may advantageously be employed. As the cation exchange resins, for example, "Duolite CS-101"—manufactured and sold by Chemical Process Co., U.S.A.— "Amberlite IRC-50"—manufactured and sold by Rohm & Haas Co., U.S.A.—etc., are especially suitable for this purpose. These resins are commercially available and can generally be produced by such methods as described, for example, in "Ion Exchange Resins," second edition, pages 85–87, by Robert Kunin, published by John Wiley & Sons, Inc., U.S.A., in 1958. Adsorption and elution may be carried out by column chromatography or in batch process.

The protease may be precipitated from its aqueous solution by the addition of a protein-precipitant such as nucleic acids, tannic acid, phosphotungstic acid, or the like.

Precipitation of the protease is facilitated by adjusting the pH of the solution to the isoelectric point. Electrodialysis may also be employed for the purpose of purification of the acid protease.

The acid protease thus produced and recovered has the outstanding properties of strongly catalyzing the hydolysis of peptide-bonds in proteins, and the catalytic action is independent of the kind of protein involved. Therefore, the protease can remarkably degrade, a variety of proteins such as casein, hemoglobin, albumin, etc. to the same degree.

The following illustrations show the activity of the acid protease and indicate the practical utilization of the same. The protease preparation used in these experiments was acetone powder of enzymes extracted from the filtered broth obtained by the cultivation of Trametes sanguinea (L. ex Fr.) Lloyd.

(a) *Action on beef.*—In 20 milliliters of an aqueous suspension of 0.1 gram of chopped beef in a buffer solution of pH 2.8, the protease preparation in a quantity corresponding to 10 milligrams of protein was allowed to react with the chopped beef at 55° C. After 20 minutes, no precipitate formed on the addition of trichloroacetic acid to the mixture. The absorption of the suspension at the wave length of 275 millimicrons—which corresponds to the characteristic absorption band of tyrosine—remarkably increased and reached the maximum 80 minutes after the start of the reaction. After 100 minutes, the chopped beef lost its intrinsic stickiness as meat and became brittle.

On the other hand, another chopped beef suspension having the same composition as above was allowed to stand at 55° C. without addition thereto of the protease preparation, whereupon no change was observed during far longer period than 100 minutes.

| Reaction time, minutes: | Absorption [1] |
|---|---|
| 0 | 0.000 |
| 20 | 0.455 |
| 40 | 0.460 |
| 60 | 0.540 |
| 80 | 0.680 |
| 100 | 0.680 |

[1] (E-value) of beef suspension (1 cm. layer) at the wave length of 275 mµ.

(b) *Action on "waste yeast."*—"Waste Yeast," which is obtained as waste material from the extraction of ribonucleic acids from yeast and of course is not soluble due to cell walls, is solubilized by the action of the acid protease. In each of 5 milliliters of the enzyme solutions listed below in the concentration of 300 milligrams percent, 100 milligrams of waste yeast was suspended, and the suspensions were kept at 37° C. for 24 hours to give the result shown below:

| Enzymes | Acidity of the medium | Solubilized solid part relative to the original solid part in waste yeast (percent) |
|---|---|---|
| Pepsin | N/100–HCl acidic | 11.9 |
| Trypsin | pH 7 (phosphate buffer) | 26.4 |
| Acid protease preparation | N/100–HCl acidic | 61.0 |

The following examples set forth presently-preferred exemplary embodiments of the present invention; they are intended to be solely illustrative, however, and not at all limitative of the invention. In the examples, percentages are on the weight basis unless otherwise noted. "ATCC" refers to American Type Culture Collection, Washington, D.C., U.S.A.

*Example 1*

Trametes sanguinea (L. ex Fr.) Lloyd (IFO–7045) was inoculated in 5 liters of the culture medium of pH about 5.2 which consisted of 5 percent of dextrin, 2 percent of cornsteep liquor, 0.15 percent of potassium dihydrogen phosphate, 0.05 percent of magnesium sulfate (7 hydrate), 2 milligrams per liter of thiamine hydrochloride, and water, and then incubated for 6 days under shaking at a temperature between 25 and 30° C. At the end of the incubation, mycelia were plentifully grown. The culture broth was centrifuged to separate a clear aqueous layer from the mycelia. Ethanol was added to the aqueous layer to obtain 25 grams of white enzyme powder. The enzymic activity as protease of the powder at pH 3.0 was:

$$PU_{m.\ eq.\ tyr.}^{Cas.,\ 37°\ C.,\ 275\ m\mu} = 1.7 \times 10^{-1}/mg.\ P.$$

The abbreviation to show protease activity, i.e.

$$PU_{m.\ eq.\ tyr.}^{Cas.,\ 37°\ C.,\ 275\ m\mu}$$

means that casein as substrate was exposed to the action of the protease at 37° C. for 20 minutes and the increase in the light absorbence at the wave length of 275 millimicrons during the reaction was measured; and that the absorbence corresponding to 1 milligram equivalent of tyrosine at the same wave length was taken as the unit of enzymic activity. The abbreviation "/mg. P." means per milligram protein.

*Trametes cinnabarina* (Jacq.) Fr. (IFO–6139) was employed instead of *Trametes sanguinea* (L. ex Fr.) Lloyd in the procedure precedingly set forth in this example, acid protease powder was again obtained. The strains of *Trametes sanguinea* (L. ex Fr.) Lloyd and *Trametes cinnabarina* (Jacq.) Fr. used in the present example are on deposit at ATCC under accession numbers ATCC–14622 and ATCC–14623, respectively.

Example 2

*Poria vaporaria* (Fr. non Pers.) Cooke (IFO–7044) was inoculated in 5 liters of the culture medium of pH 5.2 which consisted of 5 percent of glucose, 0.3 percent of polypeptone, 0.15 percent of potassium dihydrogen phosphate, 0.05 percent of magnesium sulfate (7 hydrate), 0.2 percent of yeast extract, 2 milligrams per liter of thiamine hydrochloride and water and then incubated for 6 days under shaking at a temperature from 28 to 30° C. After the incubation, the culture broth was filtered to obtain filtered broth. The protease activity of the filtered broth was determined through a modification of Kunin's method by the use of lactate buffer solution of pH 2.8 to be:

$$PU_{m.\ eq.\ tyr.}^{Cas.,\ 37°\ C.,\ 275\ m\mu} = 8.08 \times 10^{-2}/\text{milliliter}$$

Ethanol was added to the filtered broth to obtain 20 grams of enzymic powder preserving the acid protease activity.

The strain of *Poria vaporaria* (Fr. non Pers.) Cooke used in the present example is on deposit at ATCC under number ATCC–14624.

Example 3

*Trametes sanguinea* (L. ex Fr.) Lloyd (ATCC–14622; the same strain as used in Example 1) was inoculated in 30 liters of the culture medium of a pH of 3.0 to 3.2 in a tank, the medium consisting of 5 percent of dextrin, 2 percent of cornsteep liquor, 0.15 percent of potassium dihydrogen phosphate, 0.05 percent of magnesium sulfate (7 hydrate), 2 milligrams per liter of thiamine hydrochloride, and water, and then incubated for 6 days under agitation and aeration at a temperature of 25 to 30° C. After the incubation, the culture broth was filtered to obtain filtered broth. Acetone was added to the filtered broth to give 150 grams of white enzyme powder. The enzyme powder was dissolved in a small amount of hydrochloric acid-sodium acetate buffer solution of pH 3.5 in the molar concentration of 0.02 mole, and the solution was allowed to pass through a column of weak acid carboxylic acid-type cation exchanger ("Duolite CS–101"), which had been pretreated with the buffer solution of the same constitution as above-used, and then the protease absorbed in the resin was eluted with the hydrochloric acid-sodium acetate buffer solution of pH 5.5 in the molar concentration of 0.5 mole. From the eluate, fractions showing protease activity were collected and submitted to fractional precipitation by ammonium sulfate. Precipitates obtained at between 40 and 80 perment saturation of ammonium sulfate were collected and dissolved in a small amount of said buffer solution of pH 3.5 in the molar concentration of 0.02 mole, and the solution was subjected to dialysis for 24 hours against the buffer solution of the same constitution as the solvent. Into the solution remaining within the diaphragm, there was gradually added, while cooling, ca. 20 percent by volume of cooled acetone, and the mixture was allowed to stand in an ice chest. After 24 hours, crystals began to appear and the crystallization was completed after 4 to 5 days. The protease activity of the crystalline enzyme thus obtained was:

$$PU_{m.\ eq.\ tyr.}^{Cas.,\ 37°\ C.,\ 275\ m\mu} = 3.65/\text{mg. P.}$$

It was found that about 10 percent of the protease activity in the culture filtrate was preserved in the crystalline product. It was also observed that the specific activity of the product was ca. 20 times as high as that of the culture filtrate.

In the event that the dialyzed solution is colored, the color-imparting impurities can be eliminated by passing the colored solution through a tower packed with a weak base anion exchange resin (e.g. Duolite A–7, manufactured and sold by Chemical Process Co., U.S.A.) which can be produced, for example, by the method described by Kunin, supra, pages 87–88 and 97. The thus decolored solution is then further processed as precedingly described.

Figure 7:
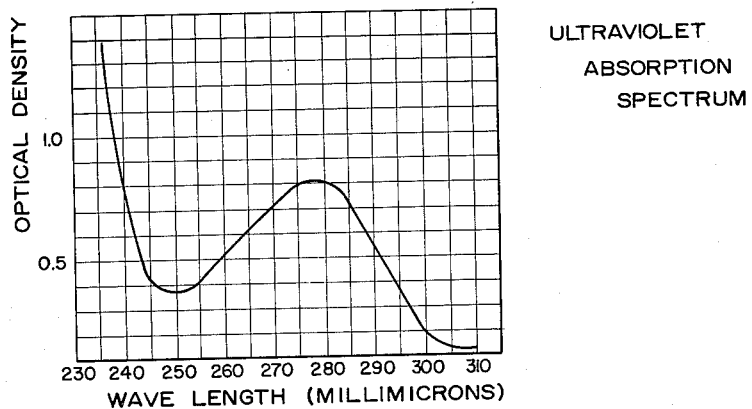

The crystalline acid protease obtained in this example shows the following properties:

(1) Its optimum pH is about 2.3 to 2.5 as shown in FIG. 1 of the accompanying drawings and its optimum temperature is about 55 to 60° C. as shown in FIG. 5—when the activity is tested against casein as substrate. It also shows the optimum pH 2.8 against hemoglobin as shown in FIG. 2 and the optimum pH 3.4 against egg albumin as shown in FIG. 3;

(2) It is stable in the pH range from 2.0 to 6.5 as shown in FIG. 4, and loses the activity by heating at 70° C. for 10 minutes without substrate as shown in FIG. 6;

(3) Its ultraviolet absorption spectrum shows the curve of a typical protein which has the maximum absorption at the wave length of 277–280 millimicrons, as shown in FIG. 7;

(4) Its uniformity is confirmed through electrophoresis by Tiselius' apparatus, where 15 percent of the enzymic protein in phosphate buffer ($\mu=0.1$) of pH 6.08 is subjected to an electric field of 72 volts at the current of 10 milliamperes for 3 hours;

(5) The uniformity of the protease was further established through the analysis by ultracentrifuge in acetate buffer ($\mu=0.1$) of pH 5.0 at a speed of $9.667 \times 10^2$ rounds per second for 75 minutes. Sedimentation constant was $9.75 \times 10^{-13}$, from which the molecular weight of the acid protease was calculated to be about $3.0 \times 10^4$;

(6) The elementary analysis of the protease:

|     | C, percent | H, percent | N, percent |
| --- | --- | --- | --- |
| (1) | 44.18 | 7.12 | 14.2 |
| (2) | 44.16 | 7.12 | 12.78 |
| (3) |       |       | 13.37 |

Figure 8:
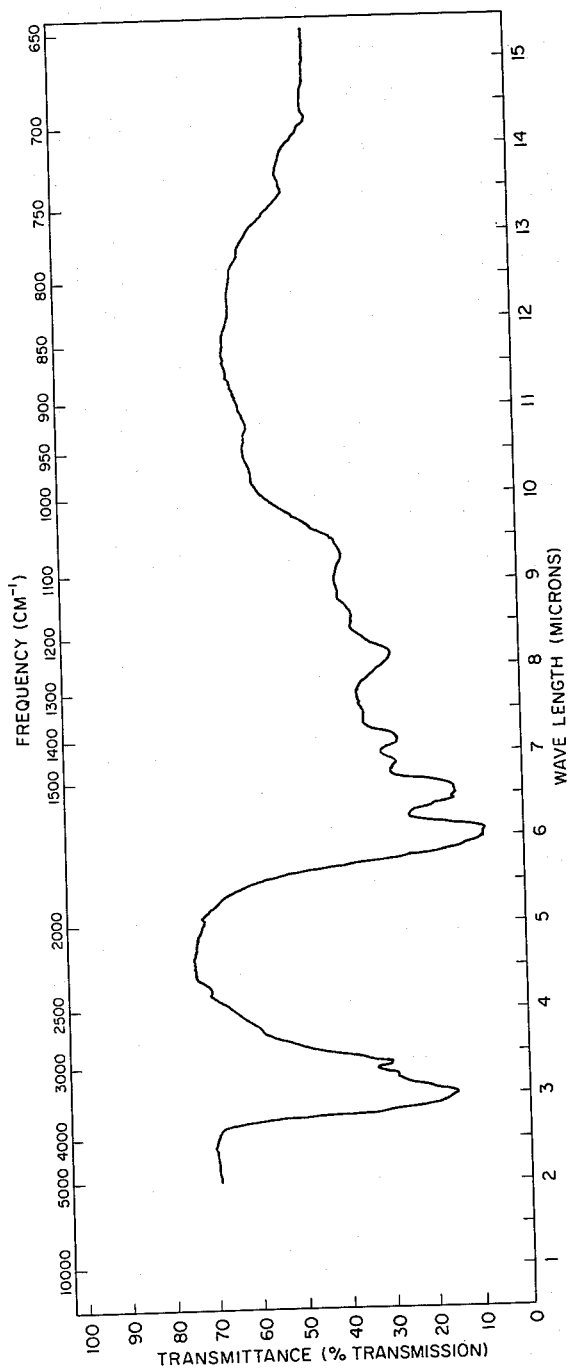

(7) The infrared absorption spectrum of the protease is shown in FIG. 8 and the significant absorption bands in microns are as follows:

3.0 (strong)
3.38 (middle)
6.05 (broad, strong)
6.55 (broad, strong)
6.88 (weak)
7.15 (broad, middle)
8.12 (middle), and
9.3 (broad, weak)

(8) It is easily soluble in water but insoluble in organic solvents such as methanol, ethanol, acetone, ether, benzene, petroleum ether, etc.; and (9) Crystal form of the protease is usually needle or platelet shape.

Having thus disclosed the invention, what is claimed is:

1. A method for producing acid protease, which comprises incubating a member selected from the group consisting of *Trametes sanguinea* (L. ex Fr.) Lloyd, *Trametes cinnabarina* (Jacq.) Fr. and *Poria vaporaria* (Fr. non Pers.) Cooke in an aqueous medium containing assimilable carbon sources, digestible nitrogen sources and other nutrients necessary for the growth of the microorganism at a temperature of from 20 to 35° C. under aerobic conditions until the acid protease is substantially accumulated in the culture broth, and recovering the accumulated acid protease from the liquid part of the culture broth.

2. The method as claimed in claim 1, wherein the microorganism is *Trametes sanguinea* (L. ex Fr.) Lloyd, ATCC–14622.

3. The method as claimed in claim 1, wherein the microorganism is *Trametes cinnabarina* (Jacq.) Fr., ATCC–14623.

4. The method as claimed in claim 1, wherein the microorganism is *Poria vaporaria* (Fr. non Pers.) Cooke, ATCC–14624.

5. A crystalline acid protease, metabolite of an acid protease-producing microorganism belonging to the family Polyporaceae, which has the following properties:

(1) optimum activity, when tested against casein as substrate, at a pH of about 2.3 to 2.5, as indicated in FIG. 1 of the drawings;

(2) optimum activity, when tested against hemoglobin as substrate, at a pH of about 2.8, as indicated in FIG. 2 of the drawings;

(3) optimum activity, when tested against egg albumin as substrate, at a pH of about 3.4, as indicated in FIG. 3 of the drawings;

(4) stability in the pH range from 2.0 to 6.5, as indicated in FIG. 4 of the drawings;

(5) maximum absorption, in its ultraviolet absorption spectrum, at the wave length of 277–280 millimicrons, as indicated in FIG. 7 of the drawings;

(6) loss of activity upon being heated at 70° C. for 10 minutes without substrate, as indicated in FIG. 6 of the drawings;

(7) molecular weight of about $3.0 \times 10^4$;

(8) infrared absorption spectrum as shown in FIG. 8 wherein the significant absorption bands in microns are as follows:
3.0 (strong),
3.38 (middle),
6.05 (broad, strong),
6.55 (broad, strong),
6.88 (weak),
7.15 (broad, middle),
8.12 (middle), and
9.3 (broad, weak);

(9) soluble in water but insoluble in organic solvents methanol, ethanol, acetone, ether, benzene and petroleum ether;

(10) elementary analysis being between 44.16 and 44.18% by weight carbon, about 7.12% by weight hydrogen and between 12.78 and 14.2% by weight nitrogen, the latter as determined by the Dumas method.

References Cited in the file of this patent

Gonshvili: Chem. Abst., 46, 4591d (1952).
Levine et al.: Journal of Bacteriology, 1953, pages 10–15, page 11 particularly relied on.